(12) United States Patent
Solaro et al.

(10) Patent No.: US 7,519,595 B2
(45) Date of Patent: Apr. 14, 2009

(54) METHOD AND SYSTEM FOR ADAPTIVE CATEGORIAL PRESENTATION OF SEARCH RESULTS

(75) Inventors: John A. Solaro, Bellevue, WA (US); John E. Knapp, Seattle, WA (US); Zubin Alexander, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 10/891,995

(22) Filed: Jul. 14, 2004

(65) Prior Publication Data

US 2006/0031214 A1      Feb. 9, 2006

(51) Int. Cl.
*G06F 7/00* (2006.01)
(52) U.S. Cl. .................................. 707/7; 707/1; 707/5
(58) Field of Classification Search ........................ None
See application file for complete search history.

(56) References Cited

U.S. PATENT DOCUMENTS

| | | | | |
|---|---|---|---|---|
| 5,519,608 A | * | 5/1996 | Kupiec | 704/9 |
| 5,924,090 A | * | 7/1999 | Krellenstein | 707/5 |
| 6,915,295 B2 | * | 7/2005 | Okamoto et al. | 707/3 |
| 6,963,867 B2 | * | 11/2005 | Ford et al. | 707/3 |
| 7,428,530 B2 | * | 9/2008 | Ramarathnam et al. | 707/3 |
| 2005/0289133 A1 | * | 12/2005 | Arrouye et al. | 707/4 |

* cited by examiner

*Primary Examiner*—Neveen Abel Jalil
*Assistant Examiner*—Christyann R Pulliam
(74) *Attorney, Agent, or Firm*—Perkins Coie LLP

(57) ABSTRACT

Search results are classified and presented by groups based on the type of each search result. Within the groups, the search results are ranked according to a rating, such as the relevancy of the result to the search request. The groups are also ordered, e.g., based upon the highest rated search result included in each group. The relative number of search results presented in the groups can vary, based upon the relative values of the highest rated search results in successive groups. When additional search results associated with a group are not initially presented for display, the group is selectively expandable to display additional search results. The expanded group, if not already first in the list, is moved to the first position, while other groups are displayed below the expanded group.

20 Claims, 14 Drawing Sheets

Welcome to Search Engine Website
File   Edit   View   Favorites   Tools   Help ← → ✕ ⟳ 🏠 🔍 Search ⭐ Favorites Address: www.searchengine.com/search?id="china"

Search Engine

Search for | China |   SEARCH

Results Results 1-10 of about 12,131,643 for China     NEXT >>

1. China News
   Latest news and opinions about today's China.
   www.chinanews.com 2. Dishworld
   Shop for china dinnerware and home accent items from our huge collection of patterns and styles.
   www.dishworld.com 3. Embassy of People's Repulic of China in the United States of America
   Embassy Information. News. Foreign Ministry Spokesperson's Remarks. China-US Relations. Visa & Passport. Overseas Chinese Affairs. For Students . . . . www.china-embassy.org 4. See China
   Lowest Prices on Airfare, hotels, and guided tours!
   Don't see China until you've seen See China!
   www.seechinatours.com 5. Study Abroad in China
   Programs affiliated with Chinese and American universities to ensure transferability of course credits . . . Concentration programs certified by . . .
   www.studyoverseas.org/china/home 6. China Geography
   China encompasses 9,571,300 sq km . . . Looking at a map . . . China borders Russia, Mongolia, and North Korea on the north, Pakistan . . .
   www.online-encyclopedia.com/china/main.htm 7. ChinaRegistry.Com – Nationwide Gift Registry
   Wholesale prices with convenience of nationwide registration and free shipping. Registration is free! Free e-mail announcements to all the . . .
   www.chinareg.biz/welcome 8. Map of China
   China
   www.pacificrimuniversity.edu/chinastudies/maps/nation.jpg 9. Images of China
   View natural beauty, art, and people of China.
   www.chinatourismboard.org 10. Manufacturing Putting China on the Map
    Industrialization of China continues to draw the attention of . . .
    www.worldfinancialnews.com/4653

Search Engine    < Back  1 2 3 4 5 6 7 8 9 . . . Next >

Welcome to Online Encyclopedia
File  Edit  View  Favorites  Tools  Help
◀ ▶ ✕ ⟳ 🏠 🔍Search ☆Favorites
Address www.online-encyclopedia.com/id=map&China

Online Encyclopedia
Search Online Encyclopedia for [China] (SEARCH)

502 — Articles
514 — China, officially the People's Republic of China (Zhonghua Renmin Gongheguo), country in East Asia, the world's largest country by population area and one....
516 — Chinese Philosophy, collective designation for the various schools of thought orignated by Chinese scholars and sage. Chinese philosophy has ....
518 — Chinese History - China traces it origins as a discrete political and cultural unit to ancient times. From the 2nd millennium bc to the early 20th century....
520 — Bejing, also known as Peking, city and capital of China, encircled by Hebei Province, located in the northern part of the country, on the northern edge....
552 — (+) More Articles (63)

550 — Images & Multimedia
504 / 524 — Flag    Great Wall    Temple of Heaven    Forbidden City
554 — (+) More Images & Multimedia (94)

506 — Maps
528 — Map of China
     Historical Map of China
556 — (+) More Maps (21)

508 — Books & Magazines about China
530 — "China" at Search Online Bookstore for books and magazines on "China"
     Visit Online Bookseller 510 — Dictionary
532 — Chi·na - noun - republic in eastern and central Asia.

512 — Other Web Resources
534 — Embassy of People's Republic of China - www.china-embassy.org
     Images of China - www.chinatourismboard.org
     Latest news and opinions about today's China - www.chinanews.com
558 — (+) More Web Resources (32)

Welcome to Online Encyclopedia

File  Edit  View  Favorites  Tools  Help

Address: www.online-encyclopedia.com/id=map&China

Online Encyclopedia

Search Online Encyclopedia for: [map of China]  (SEARCH)

Maps
- Map of China
- Map of Qing (Manchu) Dynasty
- Map of Ming Dynasty
- Map of Yuan Dynasty
- Topographical Map of China (+) More Maps (18)

Articles
China Geography
China encompasses 9,571,300 sq km . . . Looking at a map . . . China borders Russia, Mongolia, and North Korea on the north, Pakistan . . . China, officially the People's Republic of China (Zhonghua Renmin Gongheguo), country in East Asia, the world's largest country by population area and one . . . .

(+) More Articles (63)

Images & Multimedia

Gobi Desert    Kunlun Mountains    Yangtze River    Great Wall (+) More Images & Multimedia (94)

Books & Magazines about China
"Map of China" at Search Online Bookstore for books and magazines on "Map of China"

Visit Online Bookseller

Other Web Resources
Maps – The Biggest Inventory Anywhere - www.mapsoftheworld.com
U.S. and world maps - www.geoworld.org
Where in the World? Geography teaching aids - www.geo-edu.com (+) More Web Resources (32)

| | GROUP TYPE | MIN. RESULTS | MAX. RESULTS | MAX. RESULTS – EXPANDED LIST |
|---|---|---|---|---|
| 1120 | ARTICLES | 3 | 5 | 10 |
| 1122 | MAPS | 2 | 4 | 10 |
| 1124 | MULTIMEDIA | 4 | 8 | 16 |
| 1126 | WEB | 2 | 4 | 10 |
| 1128 | DICTIONARY | 2 | 4 | 10 |
| 1130 | HOMEWORK | 2 | 4 | 10 |

METHOD AND SYSTEM FOR ADAPTIVE CATEGORIAL PRESENTATION OF SEARCH RESULTS

FIELD OF THE INVENTION

The present invention generally pertains to searching for information, and more specifically, to a method and system for presenting search results on a computing system.

BACKGROUND OF THE INVENTION

The availability of CD ROMs and the ready access to the Internet provide an unprecedented and ever-increasing wealth of information to computer users. An encyclopedia that once might consume two dozen volumes and several bookshelves now fits on one or more CDs or DVDs. Countless libraries of recorded information and an endless string of media sources covering current events are available via the World Wide Web (hereinafter, the "web"). The web is a virtually limitless store of information that includes billions of web pages.

Unfortunately, however, the abundance of information, combined with the structure of the Internet potentially obscures information of interest from being readily discoverable. By its very nature, the Internet has no hierarchical structure. Thus, information of interest may be stored on any page of any domain. There is no Dewey Decimal System in cyberspace to assist users in locating information on specific topics.

On the web, most information is found using online search engines. Search engines typically employ indices formed by "web crawlers" that parse pages on the web, the pages to which those pages link, and so on. The indices used by search engines are based on words found on those pages, as well as position, prominence, frequency of user access, and other attributes. A user wanting to access the web enters search text in Boolean or plain language queries, and the search engine scours the indices to find pages using the search terms. Results typically are returned in a linear list of items, based on some form of ranking. The items are typically presented in descending ranked order, determined based on the attributes mined regarding the usage of the word or words included in the search, the frequency of access by users, or other attributes.

Search engines are generally capable of finding results of interest on almost any topic. However, because they search for strings of text, the success of a search may be hampered by the quantity of the pages indicated by the search terms, the design of the search engine, the skillfulness with which the search query was crafted, and the degree to which the information desired is capable of being accurately represented in a query.

FIG. 1 illustrates an exemplary search screen 100, which is a user interface to an Internet search engine. Search screen 100 is accessed via a web browser application that presents a site name field 102, a command bar 104, a toolbar 106, and a web address bar 108 that includes an address field 110 that both enables a user to enter a web address and displays the address to the page being displayed. In FIG. 1, a user has navigated to a search engine query page 120 that the user reached by entering the uniform resource locator (URL) 122, which is the address for search engine query page 120, in address field 110. At the search engine query page, a search field 124 includes a search bar 126, where user can enter a query. Here, the user enters as a query 128 the term "China" and then clicks on a search button 130 to initiate the search.

FIG. 2A illustrates a search results page 200 that is generated by the search engine. Address field 110 now contains an address 202 of the specific search result based on query 128 having been entered into search bar 126. More specifically, search results page 200 presents a number of items found 206 and a list of items 210-218. Most search engines present items 210-218 in the order of descending rank, regardless of the type of document that each represents. The rank, as described above, depends on factors such as the prevalence, prominence, and frequency of access of pages including the search terms, or other attributes. Each or the items 210-218, such as item 210, includes an item name 230, an item summary or portion of the item's content 232, and a URL 234, Item name 230 and URL 234 are typically presented as hypertext links, and selecting either item name 230 and URL 234 causes the browser to retrieve and display item 210, if the item is available.

Search results page 200 includes more items than can be presented on one screen or one page. As indicated in items found 206, many items have been retrieved by the search, of which only 10 are displayed on the present page. Only a few of those are displayed on the present screen. A next page link 204 causes the browser to retrieve the next set of results. A scroll bar 208 is generated by the browser, indicating and/or enabling the user to view the remaining search results of the first 10 results listed.

FIG. 2B shows the complete first page of results screen 200. Results screen 200 includes items 210-228. As can be seen in FIG. 2B, items 210-228 encompass a range of topics. Items 210 and 228 concern Chinese current events, items 212 and 222 concern dishware, items 220 and 224 concern the geography of China, and remaining items 214-218 and 226 concern other items otherwise also relating to China. Because items 210-228 cover a wide range of topics, it is unlikely that all of items 210-228 (if any) are of interest to the user of the search engine. With regard to the nation, "China" encompasses an enormous range of topics and issues. Further, because of the synonymy of the word "china" with dishware, the search may retrieve information having nothing to do with the nation of China.

Thus, considering the search for the word "China," it is not clear that any of the results retrieved or displayed on search result screen 200 would be of interest to the user; a search engine would be incapable of making this distinction. If items 210-228 are not of sufficient interest or relevance to the user, the user has a number of options. First, the user can navigate to other pages of the search results using either toolbar 106, next page link 206, or a search result navigation bar 240 generated by the search engine. Alternatively, the user may enter a new query in search bar 126. If entirely dissatisfied with the results provided by the search engine, the user may abandon the search engine entirely and enter a new address in address field 110.

FIG. 3 shows another search result screen 300 retrieving a list of items 310-318 in response to a new query. Dissatisfied with the first search, the user has commenced an entirely new search by entering a new query 328, "map of China" in search bar 126. The new query seems to indicate more clearly the type of information the user wants to access. According to the much smaller number of items found 304, a shorter and likelier narrower list of results has been retrieved. Moreover, item 316 refers to a map of China, and item 318 refers to an article about Chinese geography. Thus, if the user wanted to see a map of China, on the second attempt, the user seems to have initiated a more helpful search. In the second search, some seemingly extraneous results such as items 310-314 that also mention or include the word map are presented, but at least have not pushed seemingly more relevant results off a first results screen.

Results 316 and 318 were also retrieved by the first search of FIGS. 2A and 2B, as results 224 and 220, respectively, but the user would have needed to scroll through other results to reach items 220-224. It is possible that, upon seeing results 224 and 220, the user had the idea to search specifically for a map of China.

Considering the example of FIGS. 2A, 2B, and 3, presenting a linear list of items in search results may not return the desired information to the user. It is highly desirable to be able to present search results so as to enable a user to readily focus on a specific content for which the user is searching. Further, it is highly desirable to present search results in a way that indicates the types of content that are available, to assist the user in devising a more appropriate search.

SUMMARY OF THE INVENTION

One of the advantages of the present invention is that it provides an organized view of search results to help a user identify search results of interest. Search results are presented in groups based on their content type and are ranked within the groups, presenting the user the highest rated result or results in each group. The groups are presented in order based on the group that includes the highest rating. Therefore, the user is presented with choice of available types of search results, while still presenting the highest rated results overall, as well as the highest rated result or results in each group. Thus, for example, if the user is looking for an image under a specific topic, but the highest rated search results are printed articles, the articles will be presented in a first group, indicating the higher perceived relevance of that category. However, the highest rated map or maps found might be presented first under a map category. If a particular group is of interest, that group can be moved to the head of the list of groups and expanded to show additional search results, while the other groups are still presented in a minimized form to ensure that the other groups of results remain available for the user to view.

One aspect of the present invention is thus directed to a method for presenting a plurality of search results that are received. Each of the search results includes a type and a rating and is associated with a group, based on the type associated with the search result. The search results are sequenced within each group based on the type, the search results being ranked in descending order starting with a highest rated result. The results within each group are sequenced into a group order according to the highest rated result in the group, and the groups are presented in a group order based upon the rating of each group. At least a portion of the search results associated with each group are presented with the group, including at least the highest rated result in the group.

A portion of the search results presented in each group is adapted based on the relative rating of the search results in one group compared to that of another group. The rating of a first selected result in a first group is determined and compared to a next selected result in a next group. The portion of the search results displayed in the first group is increased when the rating of the first selected result exceeds the rating of the next selected result by at least a predetermined quantity. In one embodiment of the present invention, the first selected result in the first group includes a highest rated result in the first group, and the next selected result includes a highest rated result in the next group. The portion of the search results in the first group displayed is increased to either a predetermined maximum number or to include all of the search results in the first group. On the other hand, the portion of the search results in the first group that is displayed is limited to a predetermined minimum when the rating of the first selected result does not exceed the rating of the next selected result by at least a predetermined quantity. The predetermined quantity may include a multiplying factor, such that the portion of the search results displayed is increased when the rating of the first selected result exceeds the rating of the next selected result by at least the multiplying factor. Alternatively, the predetermined quantity may be a margin, such that the portion of the search results displayed is increased when the rating of the first selected result exceeds the rating of the next selected result by at least the margin. In one embodiment of the present invention, the portion of the search results presented in each group is determined from a table. For each group type, the table lists a maximum portion of the search results to be displayed and a minimum number of the search results to be displayed.

In each group, a count of the search results that are associated with the group, but are not included in the portion of the search results is displayed. Further, additional results are displayed when a user has indicated a desire to view additional search results for a selected group. The selected group is moved to a first position in the group order if the selected group was not already in the first position. The portion of the search results presented in the selected group is increased up to a predetermined expanded portion.

The method also provides for receiving a user search request, performing a search of a body of data, and generating the search results. The search results may be parsed to determine a principal content of the search result and assigned an appropriate type. The search results may be received from one of the Internet, a body of data accessible via the Internet, a database accessible over a network, and a database residing on the computing system on which the search results are presented. In one embodiment of the present invention, the database includes an encyclopedia.

The type associated with the search results includes a content type for each search result. The content type, for example, is an article, a map, a dictionary entry, or a multimedia file such as a motion video, a still image, or an audio file. The rating includes a relevancy factor indicating a relevance of the search results to the search request.

Among the groups, another entry can be included, presenting information in addition to the search results. The additional entry may include a sponsored link.

Another aspect of the present invention is directed to a memory medium that includes machine executable instructions for carrying out the foregoing steps.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIGS. 2A and 2B (Prior Art) are search results pages generated by the search engine in response to the query entered by the user on the search screen of FIG. 1;

FIGS. 5-7 are initial search results screens presenting groups of search results, according to one embodiment of the present invention;

FIG. 11 is an exemplary group attribute table listing ranges of results to be presented on a search results screen according to an embodiment of the present invention;

DESCRIPTION OF THE PREFERRED EMBODIMENT

Presentation of Grouped Search Results Responsive to a User Search Request

Figure 4:
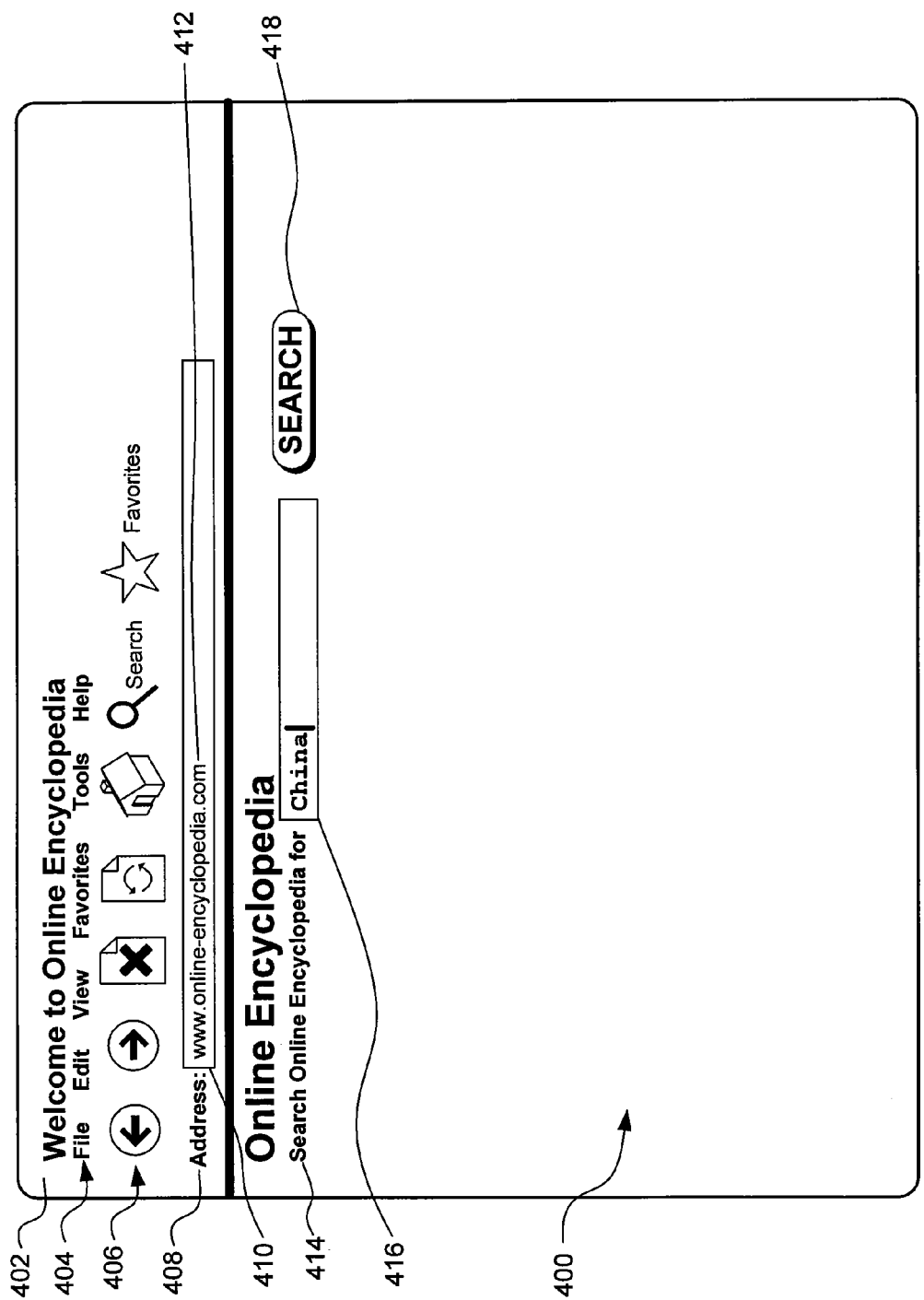
FIG. 4 is a search screen presented by an online encyclopedia through which a user enters a query to search the online encyclopedia.

FIG. 4 illustrates a search screen 400 presented by an online encyclopedia, which enables a user to enter a search request to search the online encyclopedia. Although the following discussion of exemplary preferred embodiments of the present invention describe an online encyclopedia, it will be apparent that the present invention is also usable to search other online and locally residing bodies of data. For example, the present invention is usable to present Internet search results and the results of searching other databases.

Figure 1:
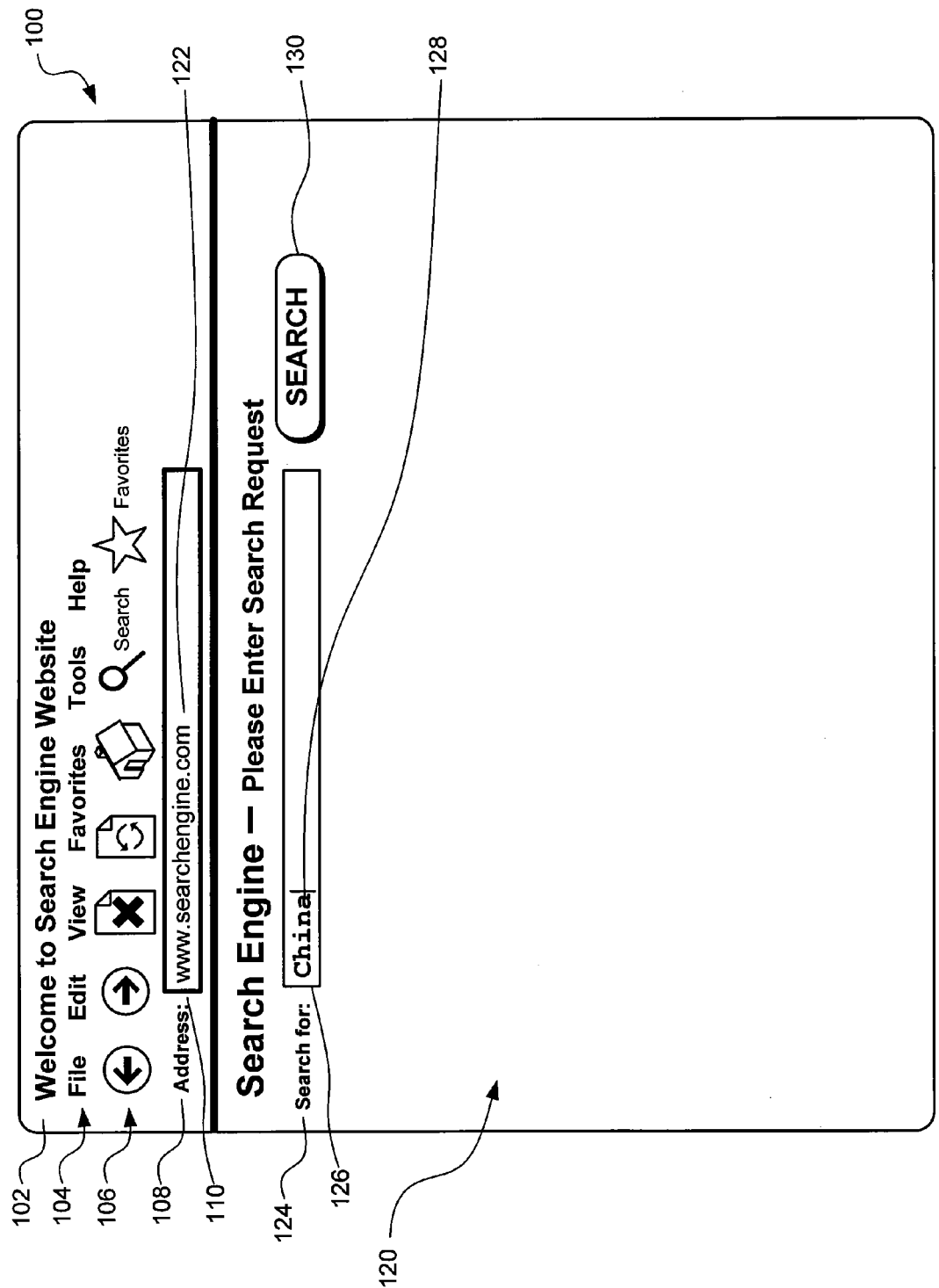
FIG. 1 (Prior Art) is a search screen presented by a representative Internet search engine, through which a user enters a query to initiate a search.
Figure 2A:
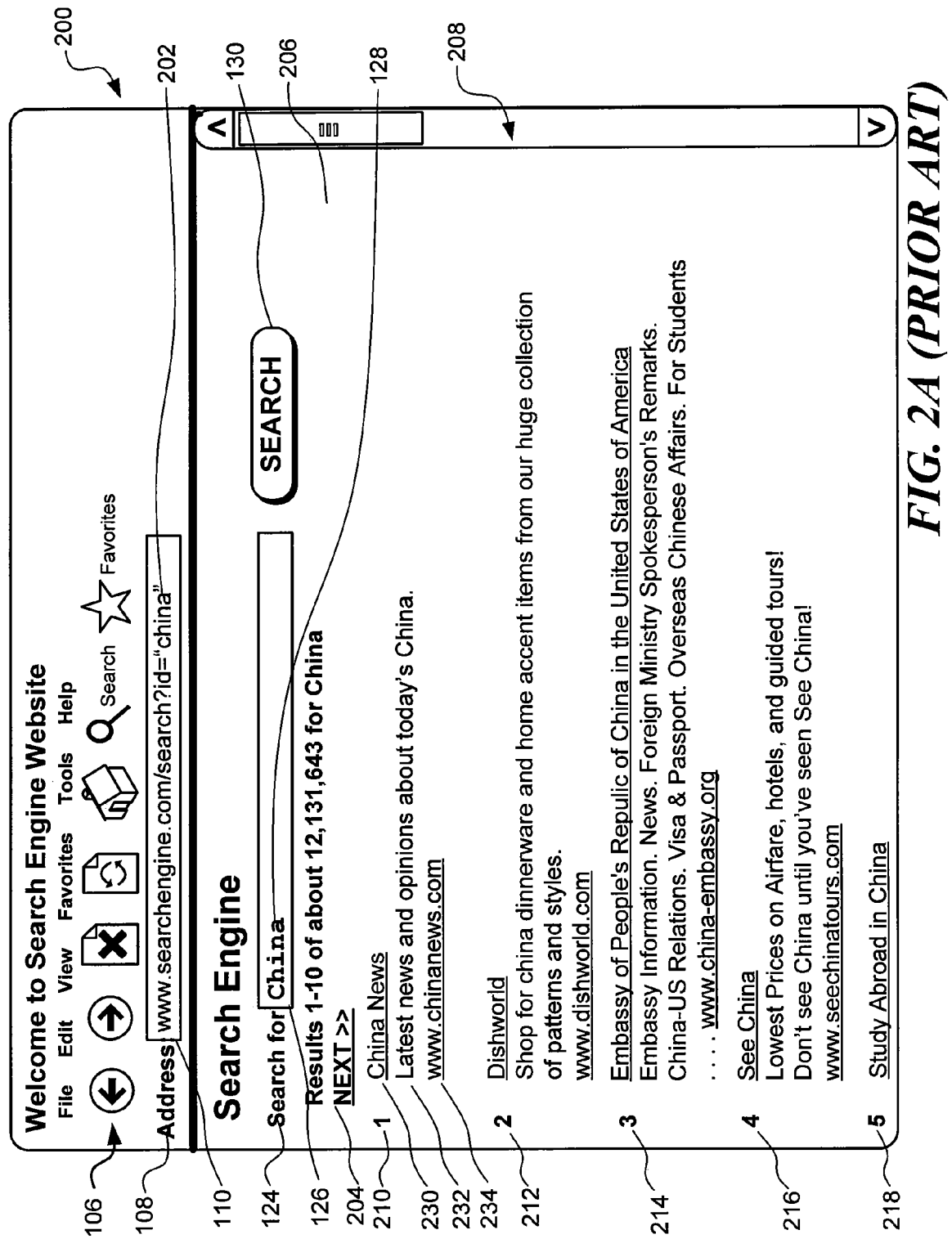
Figure 3:
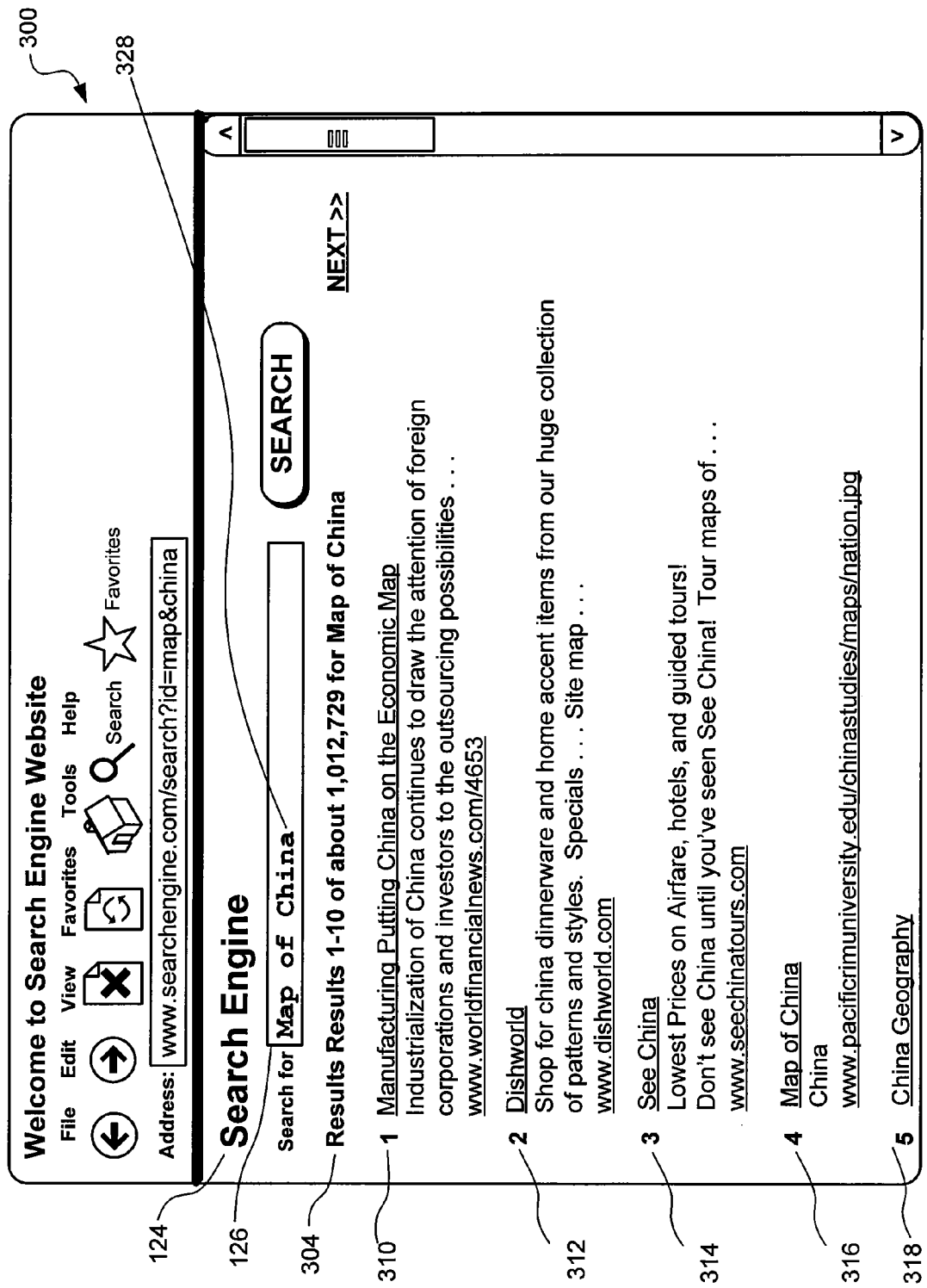
FIG. 3 (Prior Art) is another search results page generated by the search engine in response to a modified query entered by the user.

In the example of FIG. 4, search screen 400 includes an Internet browser having a site name field 402, a command bar 404, a toolbar 406, and a web address bar 408 that includes an address field 410. In FIG. 4, address field 410 includes an address 412 of an online encyclopedia. The online encyclopedia includes a search bar 414 having a search field 416. A search button 418 initiates a search of the online encyclopedia based on a search entered in the search field. For purposes of comparison, as in the example described in connection with FIGS. 1-3, the example of FIG. 4 includes a search of the online encyclopedia regarding the word "China."

FIG. 5 illustrates a search result screen 500 according to one embodiment of the present invention. Search result screen 500 presents a number of groups 502-512, each of which includes one or more search results. Search results 514-520, which are included in first group 502, comprise a list of titles and excerpts or synopses of articles from the online encyclopedia. Articles group 502 is listed first, because the articles group includes a highest rated search result. Further, search results within each group are ordered according to their rating within the group. Thus, search result 514, which is an article on "China," includes the highest rated search result in articles group 502, and is also the highest rated search result among all search results displayed on screen 500.

In a second position, screen 500 displays an images and multimedia group 504. Images and multimedia group 504 includes a plurality of thumbnails 524 each of which represent either an image, a motion video, or other multimedia result. Based on a rating that is specific to the user's search, the search results represented by thumbnails 524 include a next highest rated entry after one or more of entries 514-520 in articles group 502. A maps group 506 is listed next and includes map entries 528; map entries 528 are the next-highest rated entries after entries 524 in images and multimedia group 504.

After maps group 506, a books and magazines group 508 is listed, followed by a dictionary group 510, and an other web resources group 512. Books and magazines group 508 includes an entry 530 for an online bookseller. Books and magazines group 508 and entry 530 may represent a sponsored link or may provide other information besides actual search results. In a preferred embodiment, by agreement with a business partner, books and magazines group 508 is inserted at a fixed position (e.g., no lower than fourth in list of groups 502-512). Dictionary group 510 includes a link to a definition 532 for "China," which in this example, is rated below highest rated links in articles 502, maps 504, and maps 506 groups. Last in the list of groups is the other web resources group 512, which includes handpicked links to other web pages 534. Other web resources group 512 may be included last among groups by design, such as the position of books and magazines group 508. Other web resources group 512 may not include a sponsored link, but be positioned last for other reasons, such as a desire to first present content available in the online encyclopedia, before referring a user to other sources of information. Other web resources group 512 may also be allowed to rank automatically in the same way as other groups on the page if desired.

In addition to groups 502-512, other groups of available information also may be presented. To name just one example, a homework aid group not shown may be included. Homework aids may include synopses of novels or plays, examples of solved algebraic problems or geometrical proofs, and other types of content that may be most useful to students. Homework aids retrieved would be presented in their own group, with the entries ranked for the user. Moreover, the homework aids group could be ranked among the other groups as mentioned above in connection with FIG. 5 and as will be described in detail in connection with FIGS. 9-12.

Four aspects of search results screen 500 should be noted. First, the search results on search results screen 500 are presented in topical groups 502-512, as opposed to being presented in an undifferentiated list (as was done in conventional search results screen 200 of FIGS. 2A and 2B). Consequently, if a user is seeking a particular type of content, such as an image or a map, the user can go directly to that group and find the desired content without having to scroll through an entire page, or perhaps several pages, that do not present the desired content.

Second, although the user may proceed directly to a topical group 502-512 of interest, search results screen 500 also presents alternative groups to the user. Thus, even if the user may want to find a map or an image, articles are still presented on search results screen, and a displayed article may prove to be of interest to the user. The user is presented with these articles on the same search results display screen, without having to switch to another screen.

Third, groups 502-512 have different sizes. For example, articles group 502 includes four results 514-520, while maps group 506 lists only two entries 528. The size of the groups (i.e., the number of results in the groups), as further described below, is adaptively changed to reflect the relative rankings of the search results in different groups 502-512. For example, if results 514-520 in articles group 502 have far higher ratings than any of entries 528 in maps group 506, the relative sizes of the groups will be adjusted to graphically illustrate the disparity in ratings between groups 502 and 506.

Fourth, most of groups 502-512 include links 552-558 to additional results associated with each group. A number of additional results 550 indicates how many results of each type may be accessed by the user from the current search results. Thus, if the user is interested in additional maps, the user can select more maps link 556 to view additional maps. In sum, search results screen 500 presents a range of the available content on a single page, while still highlighting search results having higher ratings with regard to the search specified by the user, and while providing flexibility in enabling the user to access other search results not presented on search results screen 500.

Adaptive Sequencing and Sizing of Groups Responsive to a User Search Request

FIG. 6 shows a search results screen 600 that is responsive to a new search, to highlight the adaptive nature of the present invention. In search field 602, a new search for "map of China" is entered. Search results screen 600 presents different results and displays them differently in response to the search results generated. Like search results screen 500, search results screen 600 includes groups 604-612 representing articles, maps, images and multimedia, books and magazines, and other web resources. It should be noted, however, that groups 604-612 presented on search results screen 600 are both ordered and sized differently than groups 502-512 that were presented on search results screen 500 of FIG. 5.

It should also be noted that not all groups represented on search results screen 500 are represented on search results screen 600. In particular, there is no dictionary group on search results screen 600, because, presumably, no dictionary definition was found for the query "map of China." For searches that yield no results having a type invoking a particular group, the group may be omitted from the search results screen, just as the dictionary group was omitted from search results screen 600, or the group can be represented with an indication that no results were found for that group.

In response to the search for "map of China" entered in search field 602, higher rated search results include, as might be expected, a number of maps of China. As a result, maps group 604 is presented first among groups 604-612. In addition, five results 614 are presented in maps group 604, when there were only two results in maps group 506 (FIG. 5) on search results screen 500. In this example, maps group 604 is enlarged to a larger size than on search results screen 500, because the ratings of displayed results 614 in map group 604 exceed the ratings of displayed results 616 in articles group 606. Because of the relative disparity in rankings between the results in groups 604 and 606, this embodiment of the present invention is configured to display more results 614 in maps group 604 to better address the perceived needs of the user for map related information. Although only maps group 604 is enlarged in the number of results included, based on the relative ratings of search results in different groups, more than one group could be enlarged on a search results page, if appropriate, based upon the query entered by the user.

In addition to changing the order and sizes of groups 604-612 shown in search results screen 600 (relative to those in search results screen 500), other aspects of search results screen 600 should be noted in contrast to the previous example. First, the content of groups 604-612 has changed relative to the content of groups 502-512 (FIG. 5) shown in search results screen 500. For example, a "China Geography" article 616 is included in articles group 606, but not in the articles group of search results screen 500. In addition, thumbnails 618, which are listed in the results for images and multimedia group 608 are different and presumably have a higher rating with regard to the "map of China" search than to the "China" search. Even the results in an additional link 620, which may be a sponsored link in books and magazines group 610, presents different content more likely related to "map of China." Results presented in response to a search query thus adapt appropriately as the search query changes.

Also, in the more results links, links 630 and 632 show different numbers of additional results than in the search results shown in FIG. 5. The change in the number of additional results reflects both changes in the search results received, as well as the number of search results displayed on search results screen 600 as a result, for example, of the increased number of results in maps group 604. The present invention adapts salient aspects of results display screen 600 to present a user with complete information about the search results received, while assisting the reader by grouping, prioritizing, and sizing the results presented, to provide a user with convenient access to desired information.

Figure 7:
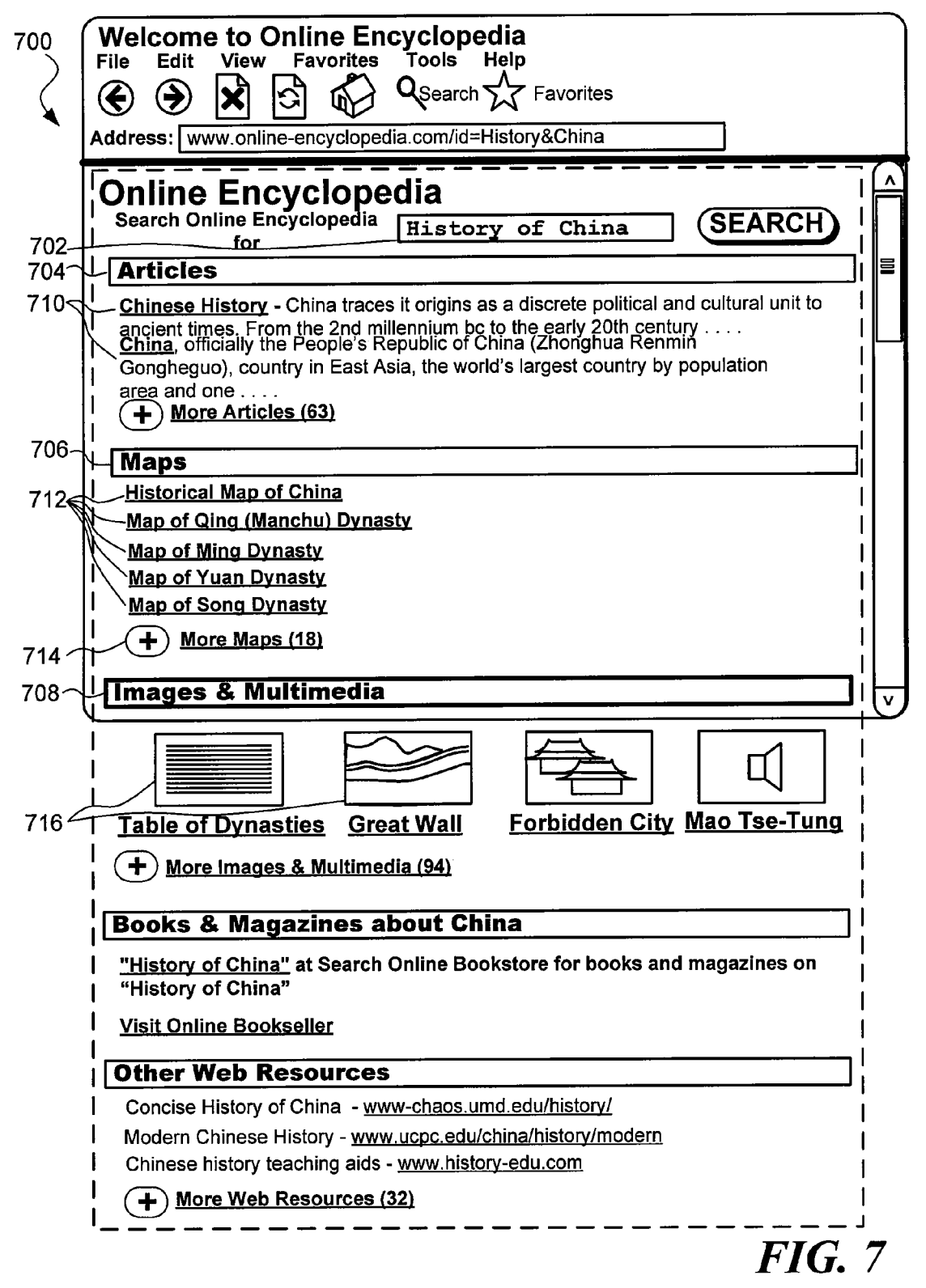

FIG. 7 shows an exemplary search results screen 700 to illustrate the flexibility in the adaptive presentation of search results provided by the present invention. Search results screen 700 presents search results responsive to a new search query entered in search field 702 for "History of China." In response to the change in the query, the search results and associated ratings with regard to the search conducted have changed, causing the results presented and the order of the groups to change. Notably, for example, an articles group 704 now includes the highest rated result and thus, articles group is listed first. However, articles group 704 lists only two results 710, while a maps group 706, which is listed after articles group 704, lists five results 712. Results 712 in maps group 706 include a number of historical maps presenting a relatively high rating in response to the search request query. Thus, although the highest rated result is included in articles group 704, results 710 in articles group are not so highly rated relative to results 712 in maps group 706 to justify enlarging articles group 704 to present more results than maps group 706. On the other hand, results 712 in maps group present a rating sufficiently higher than results 716 in images and multimedia group 708 to warrant expanding maps group 706, compared to the previous example. Thus, a preferred embodiment of the present invention independently adapts sequencing and sizing of the groups to provide a user with the best range of search results in response to a search request query.

Expansion of a Group

Figure 8:
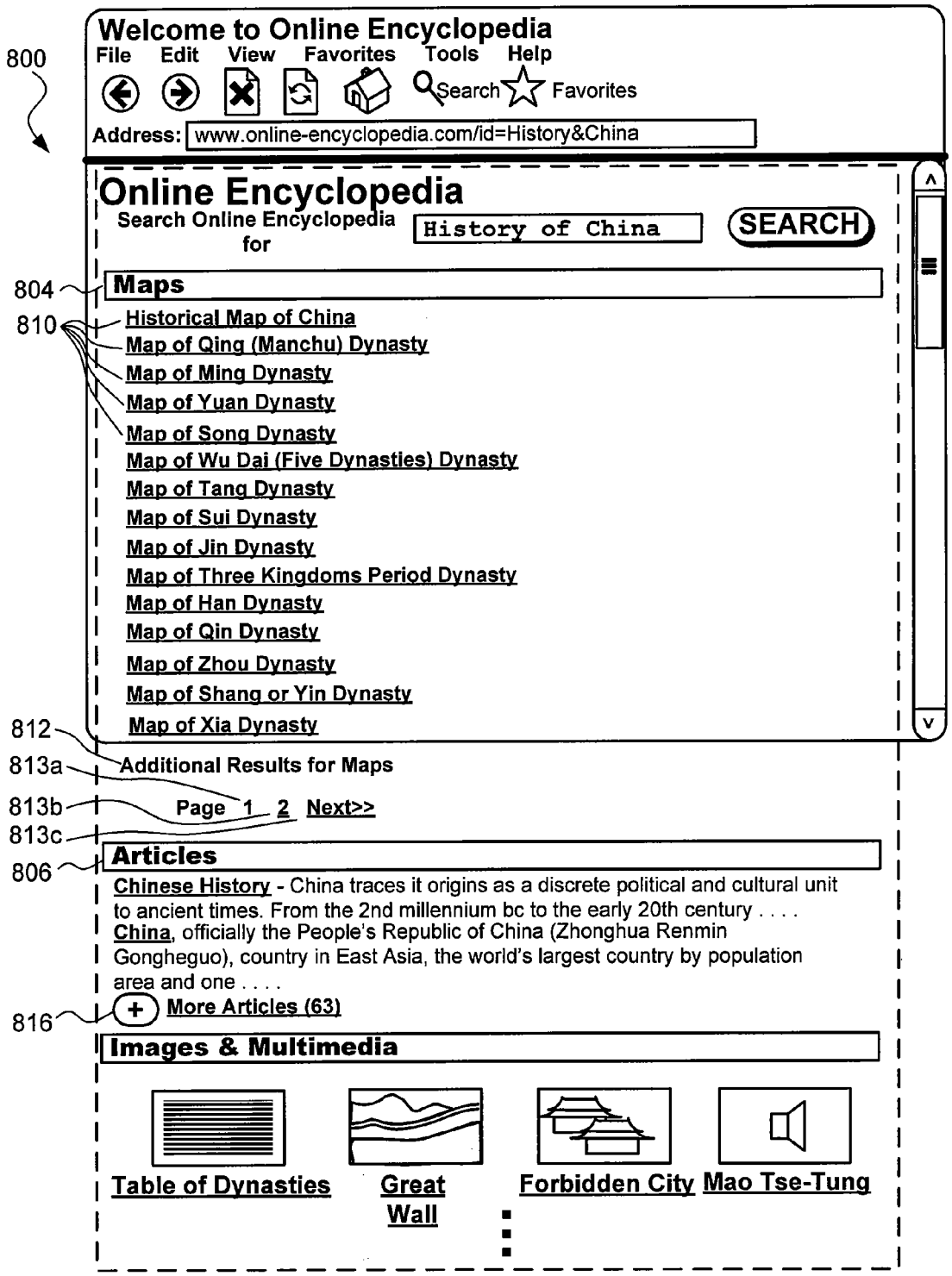
FIG. 8 is an expanded search results screen in which a group of results listed in the initial search results screen of FIG. 7 may be expanded at the user's request.

In addition to displaying a search results screen presenting the best rated results in response to the search request, the present invention is also adaptive in responding to user input. FIG. 8 shows a search results screen 800 including a reranked and an expanded maps group. Search results screen 800 is a screen presented in response to the user selecting a "more maps" link 714 (FIG. 7), indicating the user's interest in seeing more of the search results associated with maps group 706.

When a user selects a "more" link, such as "more maps" link 714 (FIG. 7), the group with which the "more" link is associated is moved to the top of the list of groups. As shown in FIG. 8, a user's interest in seeing a greater number of results 810 in maps group 804 warrants reordering or resequencing the list of groups to present the selected group first, regardless of the ratings that led to the selected group not originally being presented first. Preferably, other groups listed after the selected group are presented in the same relative order after the selected group, as they were before the selection occurred.

In addition, the number of results 810 in maps group 804 is increased in response to the user's evident interest in this group. Preferably, the number of results 810 is expanded to an expanded list maximum, as described below in connection with FIGS. 10 and 11. In one embodiment of the present invention, if a user selects a "more results" button, such as "more maps" link 714 (FIG. 7) from an initial search results screen, the results initially presented in the group that has been selected are also presented on a next screen, along with additional entries. Alternatively, only additional entries (i.e., beyond those presented on the initial search results screen) will be presented.

When results in addition to those displayed on expanded search results screen 800 are available in the selected group, an additional results link 812 indicates that still more maps are available than are displayed on this page. It is preferable to display other groups having available results on the page to enable the user to access results in another category, without having to backtrack through successive screens. Thus, the number of results shown in an expanded group is capped at a predetermined amount to maintain expanded search results page 800 at a manageable size that enables other groups of potential interest to remain visible on the page without scrolling. If all available results for a group were shown, for example in articles group 806 where more articles links 816 indicates an additional 63 articles are available, expanded search results page 800 would be very large and would force other groups so far down the page as to be inconvenient for the user to view or access. The user can select additional results link 812 to access further results not presented on expanded search results screen 800.

In one embodiment of the present invention, when a user expands a group by selecting a "more maps" link 714 (FIG. 7) and more results are available than can be shown on the current page, additional results link 812 presents a number of pages of additional results available for the user. Additional results link 812 includes a current page designation 813*a* (which is not underlined or highlighted, indicating it is the current page and not a link to another page), and one or more links to pages of additional available results 813*b*. Thus, for example, if a user pages through all or some of the pages of available additional results, and user then decides that a result listed on page 2 of additional results was the most desirable, user can follow a link to proceed directly to that page. Also, in one embodiment of the present invention, a next page link 813*c* is available to allow the user to proceed to a next page of available results without having to specifically identify what is the next page and select the link to it. Similarly, if the page displayed were not the first page, additional results link 812 would include a previous page link (not shown) to allow the user to page back through pages of previously viewed results.

Presenting results in a paginated form not only allows the user to jump back and forth to specific pages, but also communicates to the user how many pages of results are available to be viewed to see all the retrieved results. In addition to providing additional results link 812 in a paginated form, user also could be provided with a count of the number of additional results available beyond the present page. Alternatively, embodiments of the present invention may simply provide the user with a count of the additional results not yet presented through the current screen without presenting the results in a paginated form.

In addition, as mentioned above, on expanded search results screen 800, other groups are positioned after the expanded group and are contracted to a minimum size. It should be noted that other groups on search results screen 700 (FIG. 7) that was expanded to achieve search results screen 800 were already at a minimum size. Thus, for example, if a user were to select more articles link 816, maps group 804 would be repositioned after articles group 806, a maximum expanded number of articles would be presented in articles group 806, and other groups, including maps group 804 would be contracted to a minimum size in terms of the number of results presented.

Logical Steps for Presenting Search Results in Sequenced Groups

Figure 9:
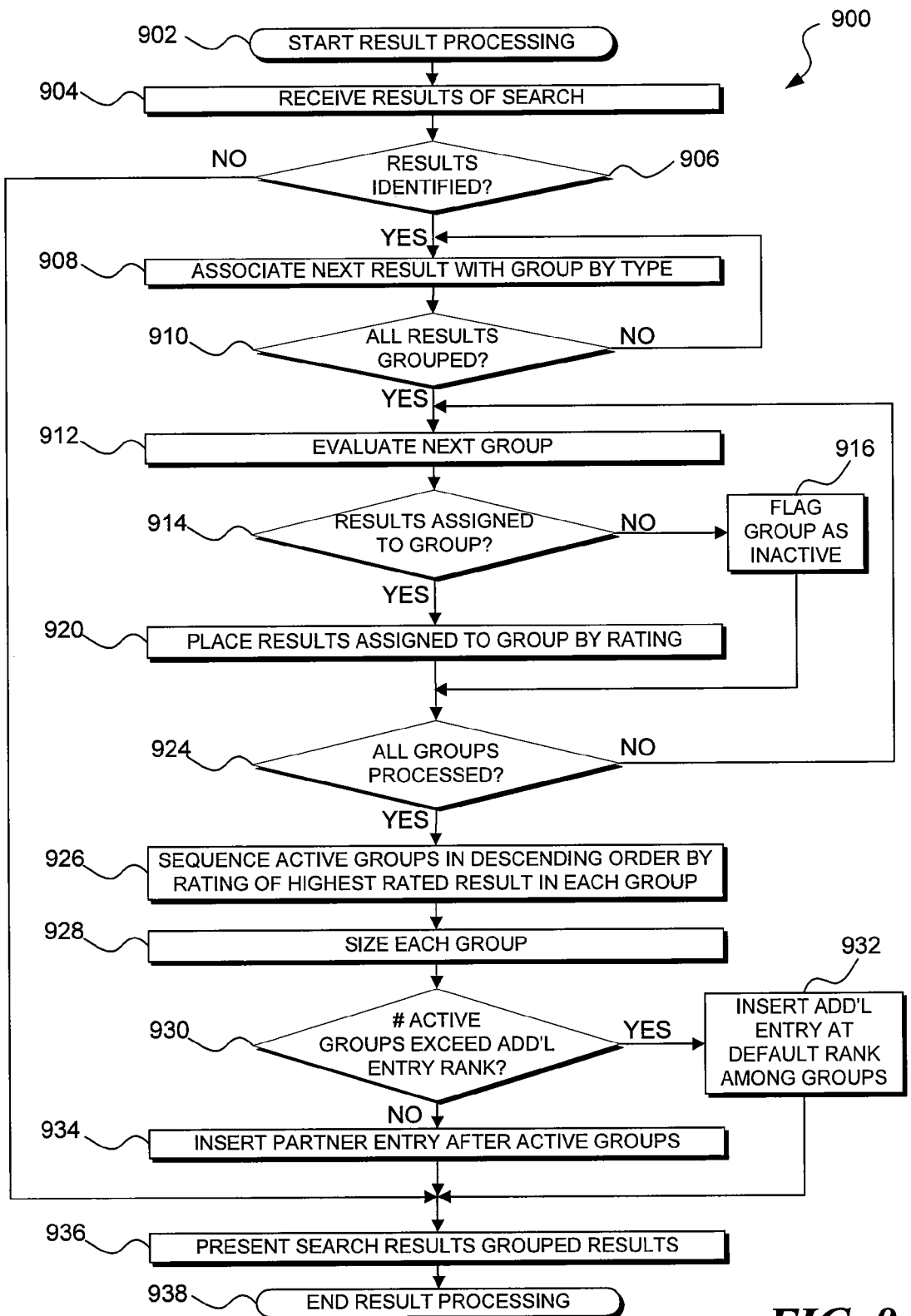
FIG. 9 is a flow diagram illustrating the logical steps for presenting grouped search results according to an embodiment of the present invention.

FIG. 9 is a flow diagram 900 illustrating the logical steps for presenting sequenced, grouped search results according to a preferred embodiment of the present invention. Flow diagram 900 begins result processing at a step 902. At a step 904, the results of a user search are received. Optionally, the present invention can include a search request interface, and a search engine, to retrieve results directly. However, in an embodiment of the invention described in flow diagram 900, results are received from a search engine, and are then processed and presented for display. The search engine that is used is expected to present the search results along with related information, such as a rating and a type for each result. The rating, for example, may include a relevancy indicator indicating how relevant a particular result is in regard to the search request. Alternatively, the rating may reflect a different quantity or merit. For example, if the search involves merchandising, the rating may represent quantity of a type of good in inventory or another rating parameter.

According to an embodiment of the present invention, the search results also will have an associated type. In the present example, the type is a document, or a content type indicating that the search result is an article, a map, etc. However, it will be appreciated that the type signifies different categorical information about a search result. For example, the type may indicate whether the search result is available from a site that charges for access, versus a site that does not. In the case of content types, if the search engine does not return a type indicator, the present invention may be configured to parse the search results to determine if a search result includes mostly text data or image data, to determine if a result should be considered to be an article, an image, or some other form of result.

At a decision step 906, it is determined if search results have been identified. If no results were obtained, the flow diagram proceeds to a step 936 to present a search results user interface which, in this case, would be an indication that no results were found. On the other hand, if it is determined at decision step 906 that results have been identified, at a step 908, a next result (which would be the first result in a list of results) is associated with a group according to its type. At a decision step 910, it is determined if all results have been associated with a group. If not, flow diagram 900 loops to step 908 to associate the next result with a group. On the other hand, if it is determined at decision step 910 that all the results have been associated with a group, the flow diagram proceeds to a step 912.

At step 912, a next group is evaluated (which would initially be the first group in a list of groups). At a decision step 914, it is determined if any results have been assigned to the group. If not, at a step 916, the group is flagged as inactive. As described above in connection with FIG. 6, if no search results are available for a particular group, the inactive group is not presented, although the inactive group could be presented with an indication that it includes no results. On the other hand, if it is determined at decision step 914 that results are associated with the group, at a step 920, the results associated with the group are placed in the group and in an order determined by the relative ratings of the results in that group. Preferably, the search results are ordered at step 920. Alternatively, the search results may be presented by the search engine already in the order of their relative ratings, so that the results can be placed in the group without having to be reordered. At a decision step 924, it is determined if all of the groups have been processed. If not, flow diagram 900 loops to step 912, for the next group to be evaluated. On the other hand, if it is determined at decision step 924 that all the groups have been processed, at a step 926, the groups are sequenced in descending order, based upon the ratings of the result in the groups. In one approach, the groups are sequenced in order, according to the rating associated with the highest rated result that is in each group. Therefore, the single-highest rated result will be presented first on the search results page because the group with which that result is associated will appear first.

At a step 928, each group is sized (i.e., in terms of the number of results presented), as further described below in connection with FIG. 10. At a decision step 930, it is determined if the number of active groups exceeds an additional entry rank. As described in connection with FIG. 5, an additional entry, such as a sponsored link, may be inserted among the groups. A default rank, such as four, may be assigned to the additional entry so that the additional entry will be inserted at the fourth position among the groups if there are at least four groups. Thus, at decision step 930 it is determined if the number of active groups exceeds the additional entry rank, which is predefined. If the number of active groups exceeds the additional entry rank, at a step 932, the additional entry is inserted at the default rank position among the groups. On the other hand, if the number of active groups does not exceed the default rank, at a step 934, the additional entry is inserted at the end of the list of active groups. At a step 936, the search results are presented to the user. The flow diagram ends at a step 938.

Logical Steps for Sizing Groups

Figure 10:
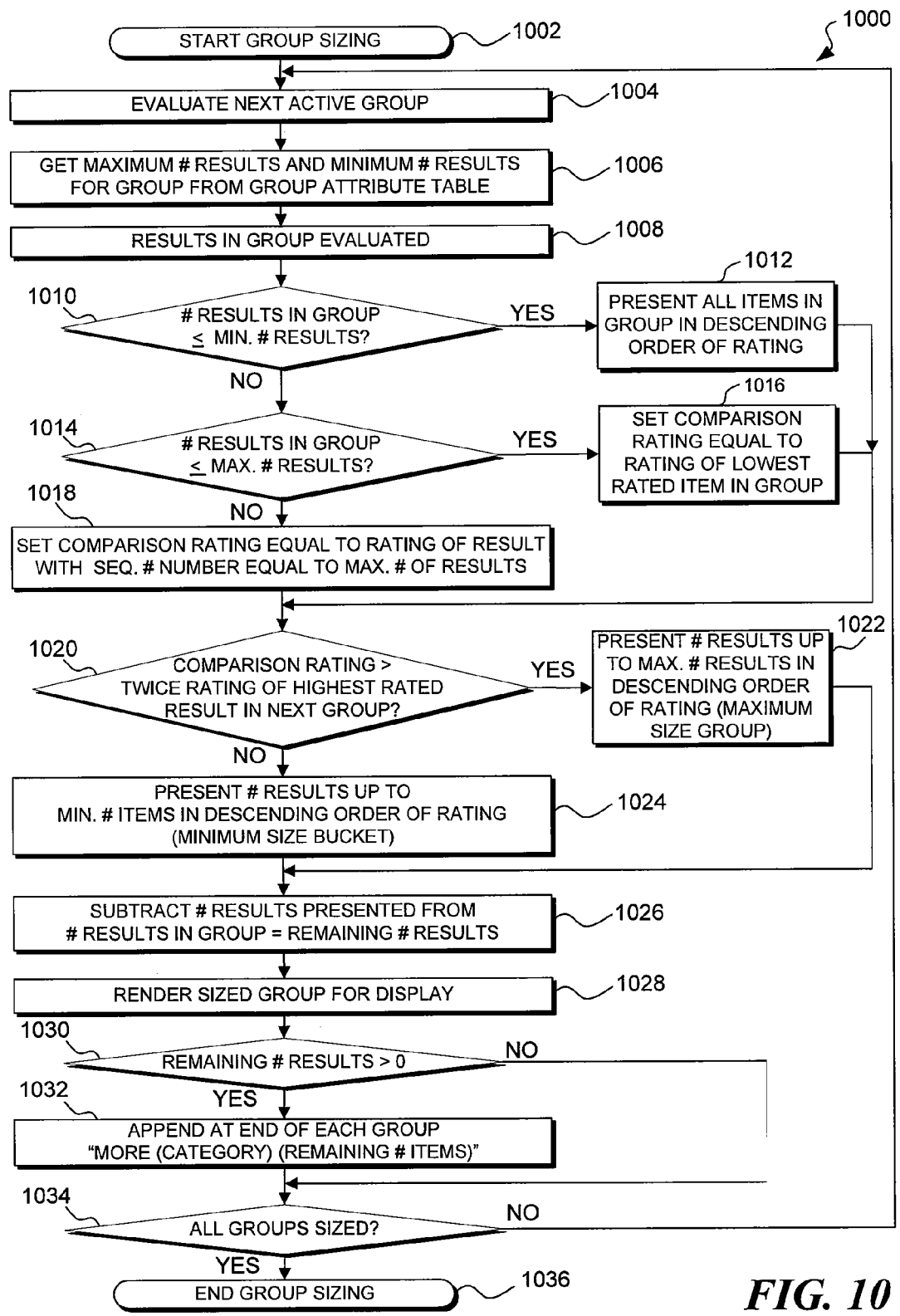
FIG. 10 is a flow diagram illustrating the logical steps for determining the size of the groups of results to be displayed according to an embodiment of the present invention.

FIG. 10 is a flow diagram 1000 illustrating the logical steps for determining the size of the groups of results to be displayed according to an embodiment of the present invention. Flow diagram 1000 begins group sizing at a step 1002. At a step 1004, a next active group is evaluated (which would be the first group at a start of a list of groups). At a step 1006, group sizing attributes, such as the maximum and minimum numbers of results to be displayed for the group, are read from a group attribute table.

FIG. 11 illustrates an exemplary group attribute table 1100, listing ranges of results to be presented on a search results screen according to one exemplary embodiment. In this embodiment, attributes in the group attribute table 1100 are set by a search result provider. However, the attributes could instead be user determinable. As exemplified in search results screens 500-800 illustrated in FIGS. 5-8, group size parameters may be set to optimize the presentation of results to the user.

Group attribute tables 1100 includes columns listing attributes for group type 1110. These attributes include minimum results displayed 1112, maximum results displayed 1114, and a maximum results displayed 1116 (when the group is expanded). Minimum results displayed 1112 indicates the fewest number of results that will be displayed when the group is neither enlarged nor expanded, assuming that the number of results in the group is at least equal to the minimum number of results attribute. The maximum results displayed 1114 indicates a maximum number of results that will be displayed when the group is not expanded, again assuming the number of results in the group is at least equal to the maximum number of results attribute. As discussed above and as described more fully below, the maximum number of results is displayed based on the relative value of ratings in one group exceeding the ratings in a next group by a predetermined amount. Also, a maximum number of results in an expanded list 1116, as described in connection with FIG. 8, indicates a limit as to how many results are presented when a group is expanded, to preserve the manageability of the expanded search results page and the visibility of other groups on the page.

Within group attribute table 1100, values for each of the attributes 1110-1116 listed in the columns of group attribute table 1100 are listed for each of a number of groups listed in the rows in group attribute table 1100. Group attribute table includes groups for including articles 1120, maps 1122, images and multimedia 1124, other web resources 1126, dictionary 1128, and homework aids 1130. Additional rows may be added to list attribute for any other groups of result types that may be available and presented to a user.

Values in the attribute table are determinable based on a number of factors. For example, the parameters on the image and multimedia group may be set, by considering factors such as a decision to display only four thumbnails per row on the search result screen, and a recognition that the images included in thumbnails may consume more resources and bandwidth when downloading the search results screen.

Referring back to flow diagram 1000 of FIG. 10, at a step 1008, the results in the group are evaluated. By way of overview, a group will be enlarged if the ratings of results that might be displayed if the group is enlarged have much higher ratings than the ratings of the results in a subsequent group. More particularly, considering a rating associated with a result that would be the last result displayed if a group is enlarged to show the maximum number of results for that group, if that rating is more than twice as great as the highest rated entry in the next group, the current group will be enlarged.

At a decision step 1010, a number of results associated with the group is compared to a minimum number of results displayed, which is read from group attribute table 1100. If the number of results is less than or equal to the minimum number of results displayed, at a step 1012, all items in the group are presented in a descending order of rating. On the other hand, if it is determined at a decision step 1010 that the number of results exceeds the minimum number of results displayed, at a decision step 1014, it is determined if the number of results is less than or equal to the maximum number of results displayed, which is also read from group attribute table 1100. If the number of results is equal to or less than the maximum number of results displayed, at a step 1016, a comparison rating is set to the rating of the last and thus, the lowest rated item in the group. On the other hand, if the number of results is greater than the maximum number of results to be displayed, at a step 1018, the rating of the result ranked at a position equal to the maximum number of results displayed is used for the comparison rating.

At a decision step 1020, the comparison rating is compared to the rating of the highest rated result in the next group. More particularly, if it is determined that the comparison rating for one group is more than twice as large as the highest rated result in the next group, the group will be expanded to a maximum size. Accordingly, at a step 1022, the number of results presented for the group will be set equal to the maximum number of results to be displayed, in descending order of ratings. On the other hand, if it is determined that the comparison rating is not more than twice as large as the highest rated result in the next group, the group will be contracted to a minimum size. Accordingly, at a step 1024, the number of results presented for the group will be equal to the minimum number of results to be displayed, in descending order of rating.

It will be appreciated that the nature of the comparisons made in determining whether a group is expanded could be adjusted in a number of ways. In one embodiment, a multiplier, e.g., a factor of two, is used to determine if one group should be expanded, because a result that might be displayed has twice the rating of a highest rated entry in a next group. Clearly, a different multiplier could instead be used. Alternatively, a margin could be used so that, if a result in one group was rated at least a predetermined number of points higher than a result in a next group, the first group might be expanded. Also, the results that are compared in the groups can be selected based upon different criteria, such as the highest ranked result, the average-ranked result, etc.

At a step 1026, the number of results presented is subtracted from the number of results associated with the group. At a step 1028, the group just evaluated is rendered to present the number of results previously determined. At a decision step 1030, it is determined if the remaining number of results at step 1026 is greater than zero. If not, flow diagram 1000 proceeds to a decision step 1034 to determine if all of the groups have been sized. If not, at a step 1032, a more results button is generated for the group to indicate the remaining number of results that are available for the group (but not currently displayed).

If, at decision step 1034, it is determined if all of the groups have not been sized, flow diagram 1000 loops to step 1004 to evaluate the next group. Once it is determined at decision step 1034 that all the groups have been sized, flow diagram 1000 for group sizing ends at a step 1036.

Logical Steps for Responding to User Selections and Expanding Groups

Figure 12:
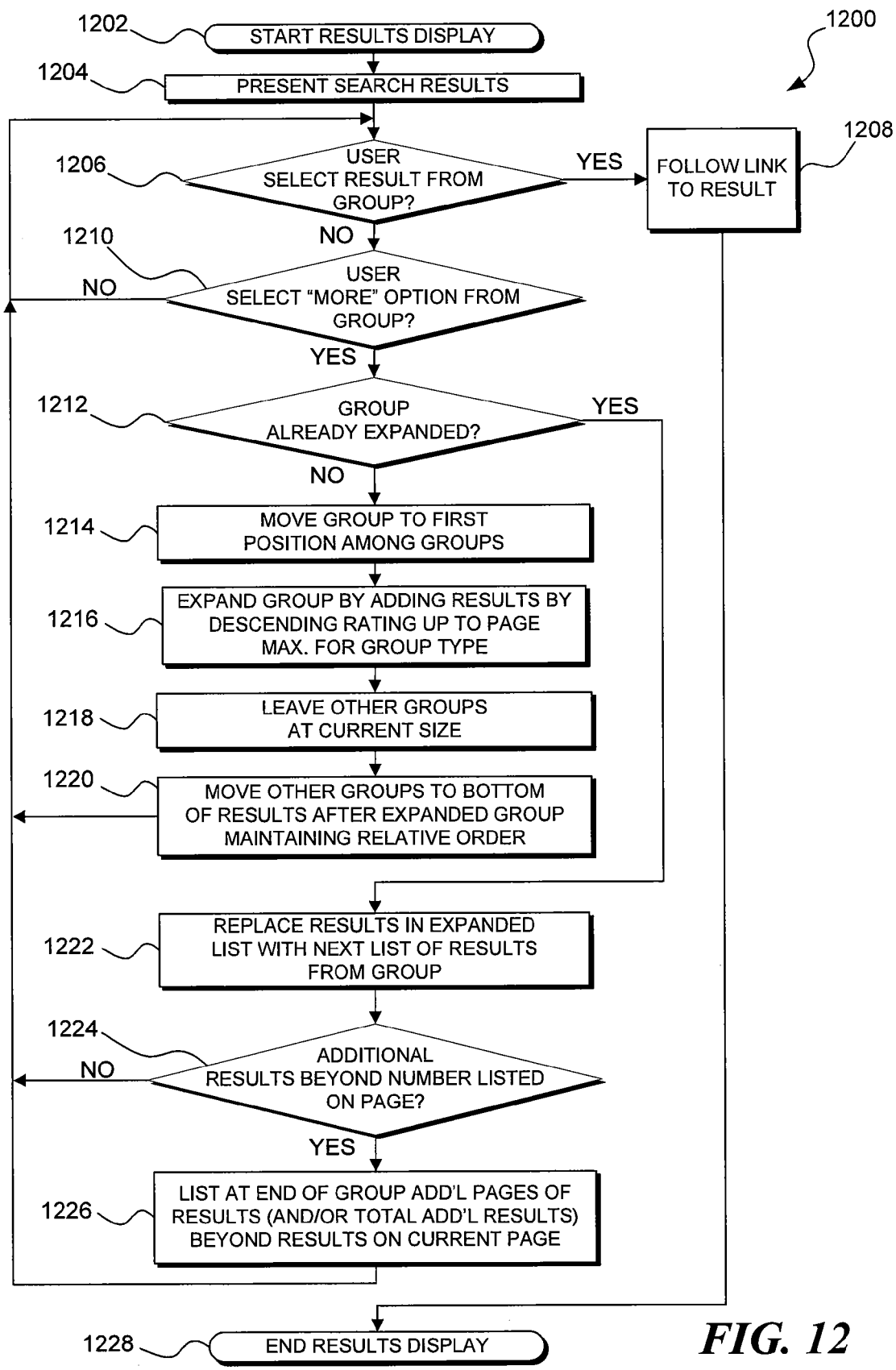
FIG. 12 is a flow diagram illustrating the logical steps for responding to user selections, such as expanding a group, according to an embodiment of the present invention.

FIG. 12 is a flow diagram 1200 illustrating the logical steps for expanding a group in response to a user selection. The flow diagram begins at a step 1202. At a step 1204, the search results are presented, as described above in connection with FIGS. 9 and 10. At a decision step 1206, it is determined if a user has selected a particular result from a displayed group. If so, at a step 1208, the link is followed to retrieve the result for the user, and the flow diagram for results display ends at a step 1228. On the other hand, if it is determined that the user has not selected a result, at a decision step 1210, it is determined if the user has selected a more results option from a group. If not, flow diagram 1200 loops to decision step 1206 to determine if the user has selected a result. On the other hand, if it is determined at decision step 1210 that that the user has selected the more results option, flow diagram 1200 proceeds to a decision step 1212.

At decision step 1212, it is determined if the group associated with the more results option is already expanded. If not, at a step 1214, the group is moved to the first position ahead of the other groups presented. At a step 1216, the group is expanded by adding results in order of descending rank, to the list of results previously presented. As described above, when a group has not already been expanded, additional results are preferably added to the results presented on the initial search results screen, rather than replacing the group's highest rated results. At a step 1218, other groups are moved to the bottom of the results list but left in their original size. It will be appreciated that, alternatively, the other groups, if not already at a minimum size, could be reduced to their minimum size. At a step 1220, other groups are moved to the bottom of the results screen after the expanded group, preferably maintaining the relative order of those other groups. Flow diagram 1200 then loops to decision step 1206 to await the user's next selection.

On the other hand, if it is determined at decision step 1212 that the group from which the more results option was selected already has been expanded, flow diagram proceeds to step 1222. At step 1222, the results listed in the expanded list are replaced with a next list of results from the group. At decision step 1224, it is determined if the additional results are associated with the group beyond the number now listed on the expanded page. If not, flow diagram 1200 loops to decision step 1206 to await the user's next selection. On the other hand, if additional results are found to remain within the group, at step 1226, a number of the remaining results is listed in additional pages options at the end of the list of results in the selected group. Flow diagram 1200 loops to decision step 1206 to await the next user selection.

Exemplary Computing System for Implementing Present Invention

Figure 13:
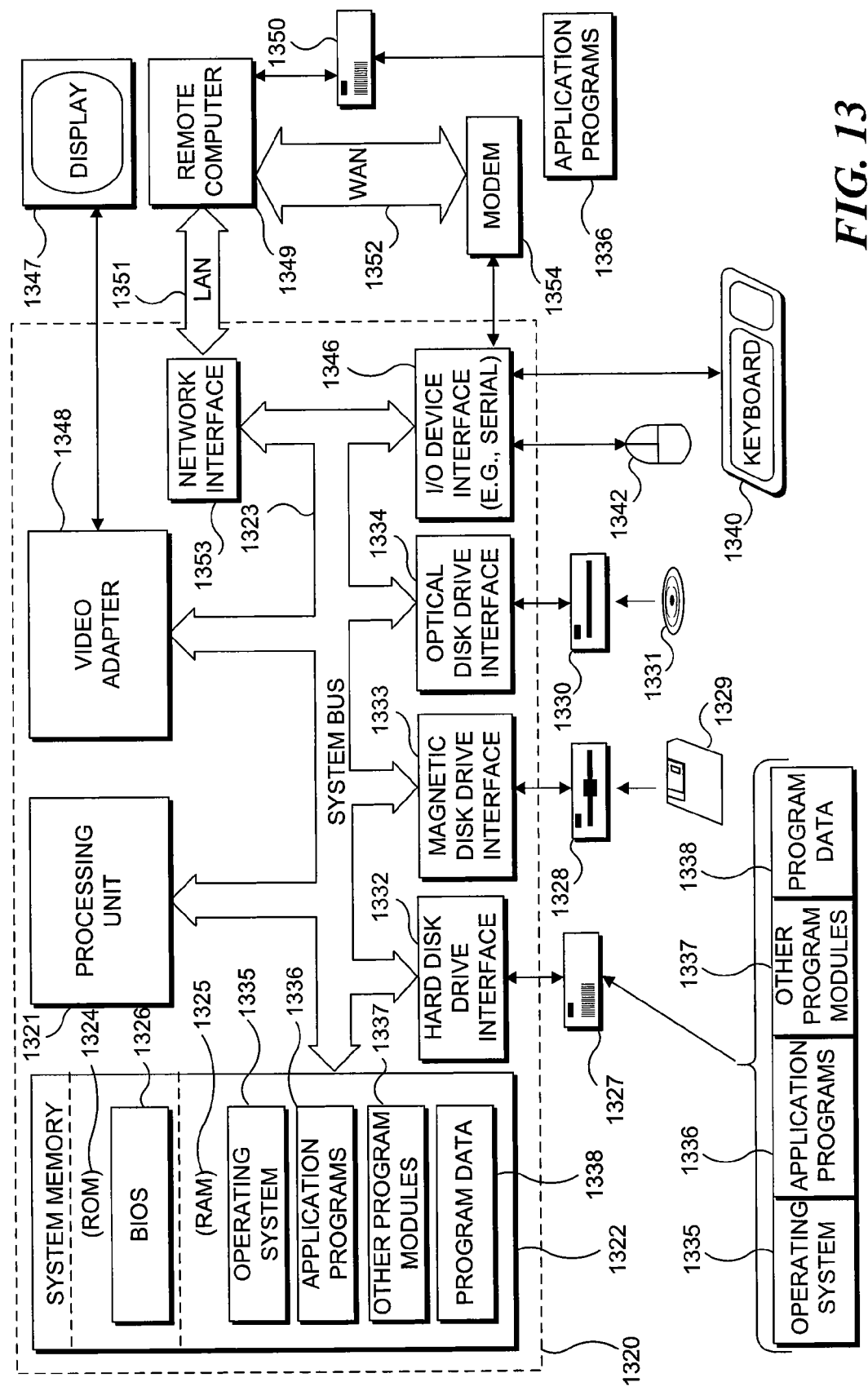
FIG. 13 is a functional block diagram of a generally conventional computing device or personal computer (PC) that is suitable for retrieving and/or presenting search results, in practicing the present invention.

With reference to FIG. 13, an exemplary system suitable for implementing various portions of the present invention is shown. The system includes a general purpose computing device in the form of a conventional PC 1320, provided with a processing unit 1321, a system memory 1322, and a system bus 1323. The system bus couples various system components including the system memory to processing unit 1321 and may be any of several types of bus structures, including a memory bus or memory controller, a peripheral bus, and a local bus using any of a variety of bus architectures. The system memory includes read only memory (ROM) 1324 and random access memory (RAM) 1325. A basic input/output system (BIOS) 1326, containing the basic routines that help to transfer information between elements within the PC 1320, such as during start up, is stored in ROM 1324. PC 1320 further includes a hard disk drive 1327 for reading from and writing to a hard disk (not shown), a magnetic disk drive 1328 for reading from or writing to a removable magnetic disk 1329, and an optical disk drive 1330 for reading from or writing to a removable optical disk 1331, such as a compact disk-read only memory (CD-ROM) or other optical media. Hard disk drive 1327, magnetic disk drive 1328, and optical disk drive 1330 are connected to system bus 1323 by a hard disk drive interface 1332, a magnetic disk drive interface 1333, and an optical disk drive interface 1334, respectively. The drives and their associated computer readable media provide nonvolatile storage of computer readable machine instructions, data structures, program modules, and other data for PC 1320. Although the exemplary environment described herein employs a hard disk, removable magnetic disk 1329, and removable optical disk 1331, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 1329, optical disk 1331, ROM 1324, or RAM 1325, including an operating system 1335, one or more application programs 1336, other program modules 1337, and program data 1338. A user may enter commands and information in PC 1320 and provide control input through input devices, such as a keyboard 1340 and a pointing device 1342. Pointing device 1342 may include a mouse, stylus, wireless remote control, or other pointer. Other input devices (not shown) may include a microphone, joystick, haptic joystick, yoke, foot pedals, game pad, satellite dish, scanner, camera, or the like. These and other input/output (I/O) devices are often connected to processing unit 1321 through an I/O device interface 1346 that is coupled to the system bus 1323. The term I/O interface is intended to encompass each interface specifically used for a serial port, a parallel port, a game port, a keyboard port, a Firewire (IEEE 1394) port, and/or a universal serial bus (USB) interface. A display 1347 can be connected to system bus 1323 via an appropriate interface, such as a video graphics adapter 1348. It will be appreciated that PCs are often coupled to other peripheral output devices (not shown), such as speakers (through a sound card or other audio interface—not shown) and printers.

The present invention may be practiced on a single machine, although PC 1320 can also operate in a networked environment using logical connections to one or more remote computers, such as a remote computer 1349. Remote computer 1349 may be another PC, a server (which is typically generally configured much like PC 1320), a router, a network PC, a peer device, or a satellite or other common network node, and typically includes many or all of the elements described above in connection with PC 1320, although only an external memory storage device 1350 has been illustrated in FIG. 13. The logical connections depicted in FIG. 13 include a local area network (LAN) 1351 and a wide area network (WAN) 1352. Such networking environments are common in offices, enterprise wide computer networks, intranets, and the Internet.

When used in a LAN networking environment, PC 1320 is connected to LAN 1351 through a network interface or adapter 1353. When used in a WAN networking environment, PC 1320 typically includes a modem 1354, or other means such as a cable modem, Digital Subscriber Line (DSL) interface, or an Integrated Service Digital Network (ISDN) interface for establishing communications over WAN 1352, such as the Internet. Modem 1354, which may be internal or external, is connected to the system bus 1323 or coupled to the bus via I/O device interface 1346, i.e., through a serial port. In a networked environment, program modules, or portions thereof, used by PC 1320 may be stored in the external memory storage device 1350. It will be appreciated that the network connections shown are exemplary and other means of establishing a communications link between the computers may be used, such as wireless communication and wide band network links.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method in a computing system for displaying search results in response to a search query, the method comprising:
   receiving the search query;
   identifying search results for the received search query, each search result having a rating and a type, the rating of a search result indicating relevancy of the search result to the received search query, wherein the search results with the same type form a group;
   specifying an order for the groups based on a highest rating of a search result within each group, the groups being ordered from a first group to a last group;
   selecting a number of search results of the first group that have ratings that are the highest ratings to be displayed for the first group;
   determining whether to increase the number of selected search results for the first group by comparing a rating of an individual non-selected search result of the first group to a highest rating of a search result of a second group, wherein the rating of the individual non-selected search result is lower than any of the ratings of the search results selected to be displayed for the first group;
   when the rating of the individual non-selected search result of the first group is higher than the highest rating of the search result of the second group, then increasing the number of the selected search results for the first group by selecting the non-selected search result of the first group with the highest rating to be displayed for the first group; and
   displaying search results in group order on a display,
   wherein the number of search results displayed for the first group is more than the number of search results displayed for groups other than the first group,
   wherein the selected search results are displayed for the first group, but the non-selected search results are not displayed, and
   wherein the search results of each group are ranked based on their ratings within the group.

2. The method of claim 1 wherein when the rating of the individual non-selected search result of the first group is higher than the highest rating of the search result of the second group, then increasing the number of the selected search results for the first group by further selecting either all of the non-selected search results of the first group or a predetermined number of the non-selected search results of the first group with the highest ratings.

3. The method of claim 1 wherein determined to increase the number of the selected search results for the first group is increased when the rating of the individual non-selected search result of the first group is higher than the highest rating of the search result in the second group by a predetermined amount.

4. The method of claim 1, further comprising displaying for the first group a count of the non-selected search results of the first group.

5. The method of claim 1, further comprising displaying at least one of the non-selected search results for the first group and the non-selected search results for the second group, wherein the displaying includes:
   receiving an indication of a desire to view at least one of the non-selected search results of the first group and the non-selected search results of the second group; and
   increasing at least one of the number of the selected search results for the first group and the number of the selected search results for the second group.

6. The method of claim 1 wherein the search results of each group are ranked in descending order based on their ratings within the group.

7. The method of claim 1, further comprising:
   determining a principal content of each search result; and assigning a type to each search result based upon the principal content of the search result.

8. The method of claim 1 wherein the type associated with each search result includes a content type for the search result, and wherein the content type includes one of:
- an article;
- a map;
- a dictionary entry;
- a multimedia file, wherein the multimedia file includes at least one of a motion video, a still image, and an audio file;
- a web resource; and
- a homework tool.

9. The method of claim 1, further comprising displaying an additional entry that includes information other than search results.

10. The method of claim 9 wherein displaying an additional entry includes displaying a sponsored link.

11. A computer-readable storage medium whose contents cause a computing system to perform a method for providing search results in response to a search query, the method comprising:
- receiving search results responsive to the search query, wherein each of the search results has a rating and a type;
- associating each of the search results with one of at least two groups based on the type associated with each of the search results;
- sequencing the groups into a group order; determining, for each group, a number of search results to be displayed in the group;
- determining the rating of a selected search result in a first group, wherein the selected search result is an individual search result that is not among the search results determined to be displayed in the first group;
- determining the rating of a selected search result in a second group;
- comparing the rating of the selected search result in the first group with the rating of the selected search result in the second group;
- based at least in part on the comparison, increasing at least one of the number of the search results to be displayed in the first group and the number of the search results to be displayed in the second group; and
- providing the groups in the group order with the number of search results to be displayed in each group.

12. The computer-readable storage medium of claim 11 wherein sequencing the groups into a group order includes sequencing the groups into a group order based on the highest rated result in each of the groups.

13. The computer-readable storage medium of claim 11 wherein the selected search result in the second group is the highest-rated search result in the second group.

14. The computer-readable storage medium of claim 11 wherein the method further comprises placing the search results into a search result order within each group based on the rating associated with each of the search results.

15. The computer-readable storage medium of claim 11 wherein the method further comprises providing an additional entry that includes information other than search results.

16. A computing device comprising:
- a processor; and
- a computer-readable storage medium coupled to the processor, the computer-readable storage medium containing instructions that when executed by the processor cause the computing device to perform a method for providing search results responsive to a search query, the method comprising:
- receiving search results responsive to the search query, wherein each of the search results has a rating and a type;
- associating each of the search results with one of at least two groups based on the type associated with each of the search results; sequencing the groups into a group order;
- determining, for each group, a number of search results to be displayed in the group;
- determining the rating of a selected search result in a first group, wherein the selected search result is an individual search result that is not among the search results determined to be displayed in the group;
- determining the rating of a selected search result in a second group;
- comparing the rating of the selected search result in the first group with the rating of the selected search result in the second group;
- based at least in part on the comparison, increasing one of the number of the search results to be displayed in the first group and the number of the search results to be displayed in the second group; and
- providing the groups in the group order with the number of search results in each group.

17. The computing device of claim 16 wherein sequencing the groups into a group order includes sequencing the groups into a group order based on the highest rated result in each of the groups.

18. The computing device of claim 16 wherein the selected search result in the second group is the highest-rated search result in the second group.

19. The computing device of claim 16 wherein the method further comprises placing the search results into a search result order within each group based on the rating associated with each of the search results.

20. The computing device of claim 16 wherein the method further comprises providing additional information that includes information other than search results.

* * * * *